United States Patent [19]

Fraser

[11] 4,208,429

[45] Jun. 17, 1980

[54] COAT CONDITIONING METHOD AND COMPOSITION FOR DOGS AND CATS

[76] Inventor: Charles E. O. Fraser, 79 Marlborough Rd., Southborough, Mass. 01772

[21] Appl. No.: 572,082

[22] Filed: Apr. 28, 1975

Related U.S. Application Data

[63] Continuation-in-part of Ser. No. 529,021, Dec. 3, 1974, abandoned.

[51] Int. Cl.$^2$ .............................................. A61K 31/23
[52] U.S. Cl. ..................................... 424/312; 424/365
[58] Field of Search ......................... 424/312, 365, 195

[56] References Cited

PUBLICATIONS

Saunders, Blance, *Training You To Train Your Dog*, United Specialists, Inc., (1946), p. 23.
*Veterinary Drug Encyclopedia and Therapeutic Index*, 12th Ed., Reuben H. Donnelley Corporation, New York, (1965), p. 29.
Ames, Felicia, *The Cat You Care For*, The New American Library Inc., (1968), pp. 46–47.
The Merck Index, 7th Edition, (1960), p. 915.
The Merck Veterinary Manual, 2nd Edition, (1961), pp. 790 and 791.
Principal Register Trademark #823,586–Reg. on 2–7-67 to Lambert-Kay Inc.
Merck Index, 7th Ed., (1960), p. 276,746.
Chemical Abstracts, vol. 75, (1971), p. 2120m.
Chemical Abstracts, vol. 70, (1969), p. 45293j.
Chemical Abstracts, vol. 69, (1968), p. 1086u.

*Primary Examiner*—V. D. Turner
*Attorney, Agent, or Firm*—George E. Kersey

[57] ABSTRACT

A veterinary composition in which the major ingredient is safflower oil. When fed to an animal, the composition provides an advantageous source of fatty acid to improve the condition of the animal. The palatability of the composition can be enhanced by the addition of a minority amount of oil of cloves, and also enhanced by the addition of a minority amount of cod liver oil.

5 Claims, No Drawings

COAT CONDITIONING METHOD AND COMPOSITION FOR DOGS AND CATS

BACKGROUND OF THE INVENTION

This is a continuation-in-part of application Ser. No. 529,021, filed Dec. 3, 1974 now abandoned.

The invention relates to the conditioning of animals, and, more particularly, to the conditioning of domesticated animals.

In modern circumstances, many animals, such as domesticated pets, find themselves in an artificial environment. Their diets often consist of pre-prepared canned foods and cereals which often are lacking in certain dietary elements, especially those needed for a healthy and natural coat. In addition, the animals are frequently kept in artifically heated buildings where their coats are subjected to an excessive drying effect.

It has been discovered that the foregoing undesirable effects can be countered by the addition of fatty acid supplements to the diets of the animals. A common source of fatty acids for veterinary purposes is linseed oil.

Unfortunately, linseed oil is sometimes insufficiently digestible by animals and causes vomiting. In other cases, linseed oil is unpalatable.

Accordingly, it is an object of the invention to compensate for dietary deficiencies in animals. A related object is to compensate for deficiencies which cause degradation in the condition of animals.

Another object of the invention is to compensate for dietary deficiencies in animals using a more desirable source of fatty acid than linseed oil. A related object is to avoid the objectionable food supplement characteristics of linseed oil.

Still an object is to enhance the palatability of fatty acid veterinary compositions.

SUMMARY OF THE INVENTION

In accomplishing the foregoing and related objects, the invention provides a veterinary composition in which the major ingredient is safflower oil. This was found to improve the condition of dogs and cats by improving their general appearance, coat, texture, appetite, or shedding. Safflower oil was found to provide a relatively bland fatty acid supplement for animal diets, with a high degree of palatability of its own. It was found to be more acceptable by animals and does not have the adverse side effects, like occasional vomiting, associated with sharper tasting substances like linseed oil.

In addition safflower oil was found to provide a richer source of poly-unsaturated fatty acid than linseed oil and other similar substances, and is more digestible.

In accordance with another aspect of the invention, oil of cloves is added in a minority amount to enhance the palatability of the composition. It was found that this additive gives the final composition an unusually high degree of palatability for dogs and makes the composition palatable to cats that often reject other dietary supplements.

In accordance with another aspect of the invention, the composition may be supplemented by cod liver oil, to further increase palatability and provide a non-vegetable source of fatty acid, as well as desired vitamins and minerals.

Other aspects of the invention will become apparent after considering a description of the invention in detail.

DETAILED DESCRIPTION

The invention is illustrated by the following, non-limiting example:

To prepare a representative sample of approximately 14 fluid ounces (413.5 milliliters), approximately 13.96 fluid ounces (413 milliliters) of safflower oil are mixed with approximately 0.04 fluid ounces (0.05 milliliters) of oil of cloves. Although the safflower oil may be used independently, it is advantageous to add the oil of cloves in order to increase the palatability of the resulting composition. It has been observed empirically that the addition of oil of cloves makes the composition particularly palatable to domestic animals, and that no dispersal agent is needed.

When safflower oil is used with only the oil of cloves additive, it has been found that the optimum percentage of the latter is about 0.121 percent of the fluid volume.

Experimental results indicate that this percentage gives the best acceptance and appetite stimulation, but lesser and slightly greater percentages also have a desirably effect.

The safflower oil is substantially pure (aside, for example, for preservatives such as BHA, BHT, or the like present in small amounts) and is represented by the product sold and marketed by General Mills under the trade name of "Betty Crocker Safflower".

The oil of cloves is also substantially pure and is of the type that is readily available commercially.

The foregoing composition is desirably supplemented by cod liver oil and fat-soluble vitamins such as A, $D_2$, and E which have a further, beneficial effect. The cod liver oil further enhances the palatability of the composition and provides a nonvegetable source of fatty acid. It may be used with the safflower oil alone.

The foregoing mixture of safflower oil and oil of cloves is further mixed with approximately 1.76 fluid ounces (52 milliters) of substantially pure cod liver oil, for example, the product sold under the name "Norwegian Cod Liver Oil" by the Marine Products Company of Boston, Mass.; approximately 0.0034 fluid ounces (0.1 milliliters) of vitamin A in the form palmitate; approximately 0.05 fluid ounces (1.5 milliliters) of vitamin $D_2$ in the form of calciferol; approximately 0.01 fluid ounces (0.3 milliliters) of vitamin E in the form of acetate; and approximately 0.203 fluid ounces (6.0 milliliters) of dispersion agent in the form of polyoxyethylene-mono-oleate, such as the product also known as "Sorbitan" and sold and marketed by company under the name "Tween 80" by the Sigma Chemical Company of St. Louis, Mo. A trace of the product sold and marketed under the name "BHA" is desirably added as preservative.

The resulting composition was found on analysis to contain about 250,000 milligrams of linoleic acid; 10,000 milligrams of oleic acid; 5,000 milligrams of palmitoleic acid; 12,000 milligrams of polyethenoic acid; 75,000 U.S.P. units of palmitate (vitamin A); 3,000,000 U.S.P. units of calciferol (vitamin $D_2$); and 300 U.S.P. units of acetate (vitamin E).

After being mixed with the vitamin and other additives the percentage of safflower oil in the composition was reduced to 87.24 percent, as compared with 87.9 percent in a two ingredient composition. The corresponding range for the oil of clove additive is 0.1056 percent to 0.1209 percent in a two ingredient composition.

The percentage of cod liver oil is approximately 10.98 percent, and is as high as approximately 11.2 percent when mixed with only safflower oil.

Although the example makes use of vitamin E, for example, in the form of acetate, the only requirement for it, and for the other vitamin additives is that they be fat soluble, and vitamin E in the form of a suitable material may also be used.

A coat conditioner prepared in accordance with the foregoing example and containing about 87.24 percent safflower oil, about 0.12 percent oil of cloves, about 10.98 percent cod liver oil and the remainder about 1.66 percent as vitamin supplements was tested on a number of animals in accordance with the following dosage table.

DOSAGE TABLE

| Weight | Dosage |
| --- | --- |
| 1–10 pounds | ¼ teaspoon daily |
| 10–20 pounds | ½ teaspoon daily |
| 20–50 pounds | 1 teaspoon daily |
| over 50 pounds | 1½ teaspoon daily. |

The following illustrative results are obtained:

TEST I

A Norwegian Elkhound weighing under 20 pounds at age 5 months was observed to have a dry coat and shedding of scurf (dry scales). After two weeks of treatment in accordance with the Dosage Table the dryness had decreased, the skin was much improved and the weight of the animal had increased to 23 pounds. After an additional 10 days of treatment the coat was observed to be much improved, with the scaling and shedding much reduced. Appetite had increased and the weight of the animal was 26.5 pounds.

TEST II

A German Shepherd weighing 78 pounds at 4 years had a dry coat and heavy shedding during winter. After 13 days of treatment in accordance with the Dosage Table, the coat, general appearance and appetite were much improved, and there was a reduction in shedding. The treatment was continued for another month and further improvements were noted. A number of months after the original treatment had been completed, the dog was again observed to be shedding during the winter. The treatment was recommenced in accordance with the Dosage Table, and in about one month the appetite, coat texture, shedding and general appearance of the dog were much improved.

TEST III

A Mixed Canine weighing 17 pounds at 11 weeks was observed to have a very dry coat. After 5 days of treatment in accordance with the Dosage Table the weight had increased to 20 pounds. After about an additional six weeks the weight had increased to 33 pounds and the texture of the coat and general appearance of the animal were much improved.

TEST IV

A cat weighing 10 pounds at two years and a second cat weighing 8 pounds at two years were both observed to have heavy shedding during the summer. After about a month of treatment in accordance with the Dosage Table the general appearance of both animals had improved, shedding had been reduced and appetite was noticeably improved. A number of months after the original treatment had been completed, it was recommenced in winter in accordance with the Dosage Table. In about a month there was a marked increase in appetite. In addition, general appearance, coat texture and the shedding condition were much improved.

As a result of the foregoing and other tests, it was observed that the composition gave improvement in some cases in about 7 days; in approximately fifty percent of the cases in about 14 days; and in substantially the remainder of the cases in about 21 days. Not only was the general condition of the animals improved, their coats generally became softer and less brittle, a and had a glossier appearance, i.e. better quality. Although it is normal for animals to shed in the spring, the composition was able, in a number of cases, to provide a beneficial control of shedding at other times of the year.

In general the composition was found to be palatable to 96 percent of the dogs on which it was tested. It produced an improvement in general appearance in 96 percent of those cases, an improvement in coat texture in 88 percent, an improvement in appetite in 87 percent and improvement in shedding in 85 percent of the cases.

The composition was palatable to all tested cats whose conditions needed improvement, and it produced an inprovement in general appearance, coat texture, appetite, and shedding in all cases.

In the typical case the composition improved the appetite of the animal being treated in 48 to 72 hours.

Other aspects of the invention will occur to those skilled in the art based on the foregoing disclosure and such modifications, including the substitution of equivalents for what has been shown and described, may be made without departing from the spirit and scope of the invention as set forth in the appended claims.

What is claimed is:

1. The method of improving the condition of the coat of a dog or cat, in need of improvement, comprising feeding the dog or cat with safflower oil in an amount effective to improve its coat condition, said condition resulting from a lack of dietary elements or excessive drying of the coat, with oil of cloves added to said safflower oil in an amount effective to enhance its palatability.

2. The method of claim 1 in which cod liver oil is added to said safflower oil in an amount effective to further enhance its palatability and provide a non-vegetable source of fatty acid.

3. The method of claim 1 in which said safflower oil is at least eighty-seven percent of the total amount fed.

4. The method of claim 2 in which said safflower oil is at least eighty-seven percent of the total amount fed and said cod live oil is less than eleven percent of the total amount fed.

5. The method of claim 2 in which an oil soluble vitamin selected from the class consisting of A, $D_2$ and E is added to said safflower oil in an amount effective to provide a vitamin supplement.

* * * * *